United States Patent Office 3,203,085
Patented Aug. 31, 1965

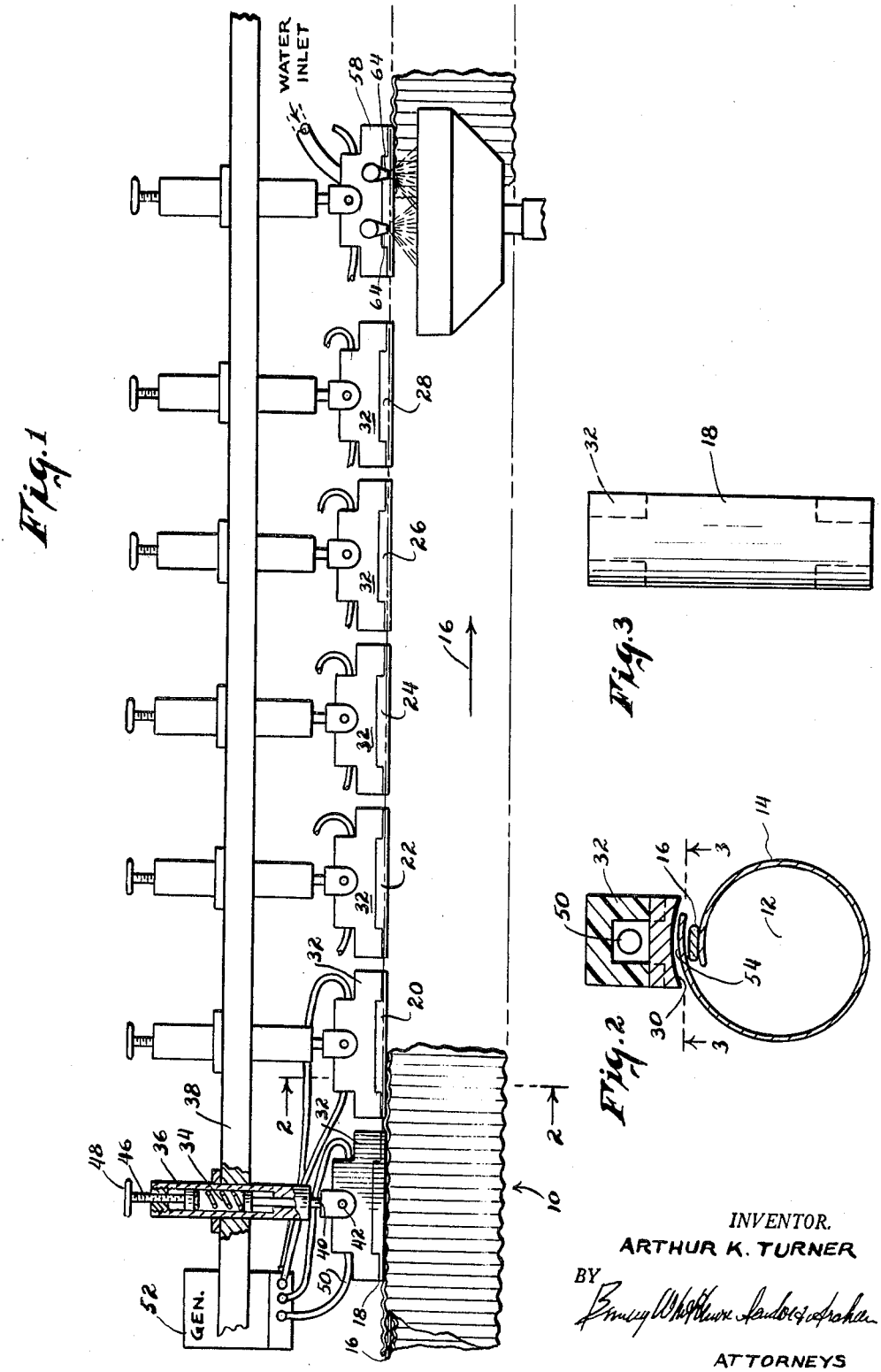

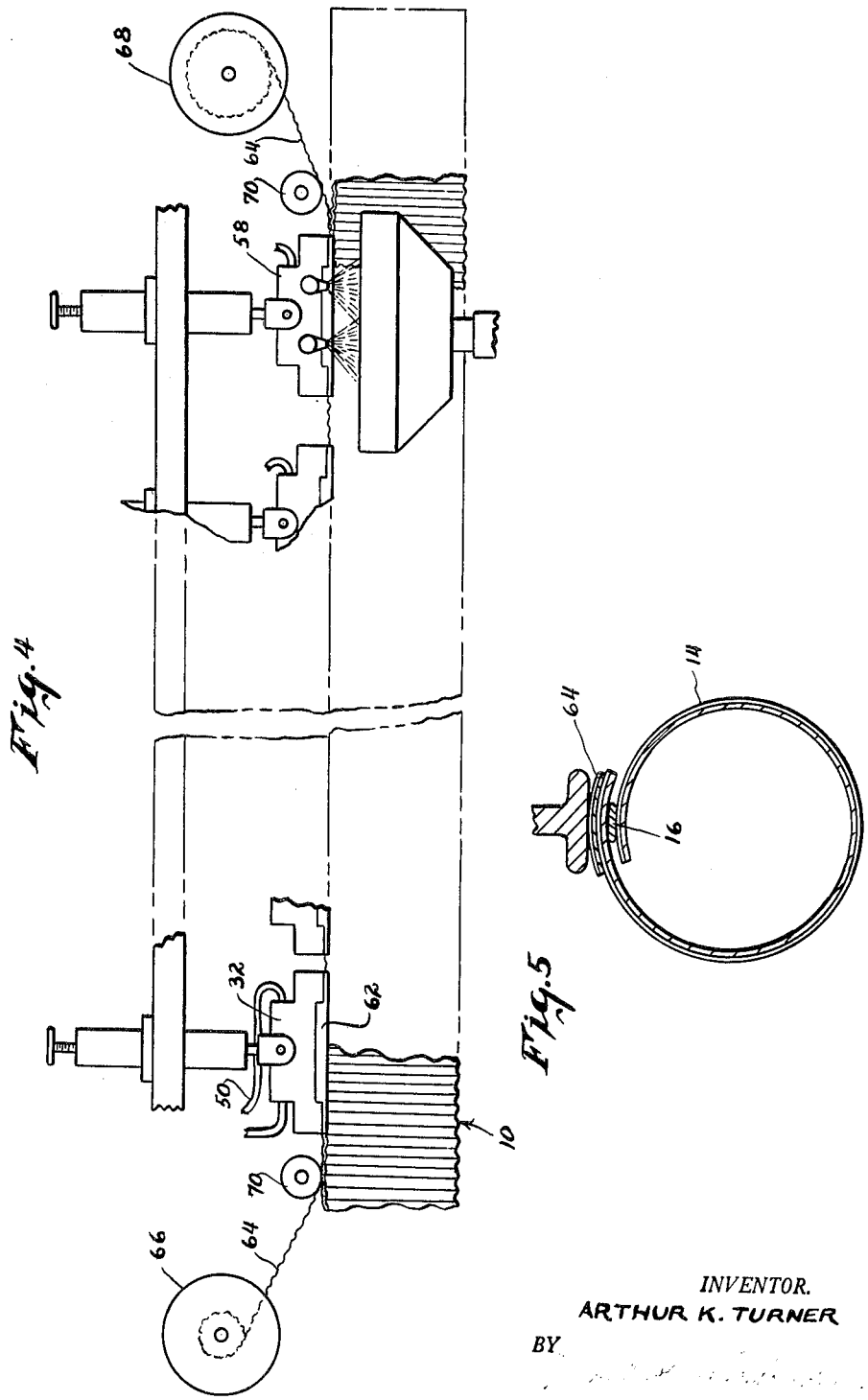

3,203,085
CONTINUOUS SOLDERING METHOD AND APPARATUS
Arthur K. Turner, Bayonne, N.J., assignor to General Cable Corporation, New York, N.Y., a corporation of New Jersey
Filed June 23, 1961, Ser. No. 119,219
9 Claims. (Cl. 29—498)

This invention relates to an improved method and means for continuous soldering of the lap joint of a non-ferrous sheath which is formed about a cable core.

Cables having a conductor core enclosed within a corrugated metallic sheath or sheaths, such as a steel sheath, the edges of which are overlapped and soldered together to provide the requisite protection against entry of moisture as well as the desired electrical shielding properties, are known to the art. For example, the well known Stalpeth telephone cables incorporate such construction.

In the usual manufacturing arrangement the steel sheath is folded to enclose the cable. A solder strip is fed between the lapped edges of the sheath. Shoes riding on the seam maintain good mechanical contact between the edges and the solder.

Work coils of induction heating equipment are positioned near the shoes to heat the top lap of the sheath by the induced currents therein. The solder and bottom lap are then heated by conduction to the temperature at which the solder melts to form the desired bonded seam. The induction heating equipment allows the needed precision of control over the temperature induced in the top lap. A high induced temperature is necessary to melt the solder at a rate compatible with normal cable manufacturing speeds. However, the temperature must be maintained below that which would burn the sheath lap.

However, when the sheath is formed of non-ferrous metal, such as copper or a high conductivity copper alloy, induction heating of the seam cannot be accomplished in economical fashion.

The usual methods of direct heating, such as soldering irons or gas jets, do not offer the necessary temperature control precision and are not compatible with normal and expensive manufacturing equipment.

It is, therefore, one object of this invention to provide an improved method and apparatus for the continuous soldering of an overlapped seam in a non-ferrous sheath which is suitable for the production speeds required by the art.

It is a further object of this invention to provide an improved method and means for the continuous soldering of a lapped seam in a non-ferrous sheath which is compatible with current production equipment used in the art.

In accordance with these objects there is provided, in a preferred embodiment of this invention, a plurality of shoes which are adapted to ride along the seam formed in a non-ferrous sheath. The seam is formed by lapping the edges of the sheath over an inserted solder strip in conventional fashion.

Each of the shoes is urged into contact with the seam under spring pressure, the magnitude of which may be adjusted to suit the application intended.

Each of the shoes comprises a Transite holder and a steel work shoe adapted to bear directly upon the seam in the sheath. The work coil of a radio frequency (RF) generator passes through the Transite holder to generate a field which will heat the steel shoes by the electrical currents induced therein due to coupling of the RF field to the steel shoe.

The heated steel shoe is urged into engagement with the seam to transfer heat to the seam in order to melt the solder and provide sufficient pressure to maintain the overlapped edges of the seam in good physical contact with the interposed molten solder. The solder seam may then be cooled to solidify the solder in a bond.

Due to the speed with which the seam formation must proceed to be compatible with the cable manufacture, there is provided a plurality of shoes to gradually heat the seam and the solder interposed between lapped edges of the sheath to the point of melting of the solder.

The shoes are preferably provided with a working surface which conforms to the radius of the assembled cable. The work surfaces are preferably faced with a hard finish, such as a Stellite finish, to reduce wear and may be lubricated with material, such as graphite, to reduce the friction between the moving cable and the working shoe.

In accordance with another embodiment of this invention, there is provided a plurality of shoes fabricated from insulator material, such as glass. The shoe holder and the contact pressure of the shoe on the lap seam is identical with that of the preferred embodiment.

A corrugated strip of steel is positioned on the seam prior to feeding the sheathed cable under the pressure shoes. The steel strip corrugations match the sheath corrugations so that the sheathed cable with the overlying steel strip can be fed under the bank of pressure shoes as an assembly.

The induction heating generators establish RF fields to heat the corrugated steel strip. The strip transfers heat to the seam thereby to melt the solder and form the soldered seam under the pressure of the shoes. The seam may then be cooled to solidify the solder and the steel strip removed from the seam. In this manner, there is provided, in effect, a heated shoe which travels with the cable for seam soldering.

The invention will be more easily understood by reference to the following description taken in combination with the accompanying drawings, of which:

FIG. 1 is an elevation view of a cable being manufactured in accordance with the present invention;

FIG. 2 is a cross section taken along lines 2—2 of FIG. 1;

FIG. 3 is a plan view of the shoe shown in FIG. 2 taken along lines 3—3 of FIG. 2;

FIG. 4 is an elevation view of another embodiment of this invention; and

FIG. 5 is a cross section view taken along lines 5—5 of FIG. 4.

In FIGS. 1–3 there is shown a cable 10 having a conductor core generally represented at 12 encased within a non-ferrous metallic sheath 14. The sheath is a corrugated sheath to encase the cable core in an impenetrable metallic barrier to provide the requisite protection against the ingress of moisture and the like into the core. The metallic sheath will also serve as an electrical shield preventing interaction between adjacent cables. The sheath is corrugated to provide the desired flexibility of the assembled cable.

The sheath is folded about the conductor 12 by conventional dies known to the art to encase the conductor within the sheath. The sheath is of sufficient width to overlap at the edges. A ribbon of solder 16 is fed between the overlapped edges so that when the solder is melted and the edges clamped together under pressure, the lapped edges will be soldered together in a continuous, impenetrable seam.

The solder used may conveniently be a 30–70 solder which is solid up to temperatures of about 360°, pasty at temperatures between 360° and 500°, and liquid above approximately 500° F.

The cable is then moved in the direction indicated by arrow 16 under a plurality of heating shoes 18, 20, 22, 24, 26 and 28. The shoes are provided with a working surface 30 which conforms approximately to the radius of the assembled cable. To reduce wear on the working surface, the work surface may be faced with a hard facing, such as Stellite, and may be lubricated with a temperature resistant lubricant, such as graphite. Each shoe is carried by a holder 32 formed of a hard, non-conductive ceramic or an asbestos-cement composition, such as Transite. The entire assembly consisting of the holder and the shoe is pressed into intimate contact with the seam by a spring 34 encased within a holder 36 mounted in a rigid beam 38. This spring pressure is transmitted through a shaft 40 pinned to the top of the holder by pin 42 extending through an eye on the holder. The spring pressure is adjustable to suit the application intended by a preload screw 46 operable through handle 48 to give the requisite bearing pressure upon the seam.

Extending through the holder is a work coil 50 energized by an RF generator 52 to establish a radio frequency electro-magnetic field at, for example, 400 kc./sec. which is closely coupled to the steel shoe 18. The high frequency field induces electric currents within the steel shoe to heat the shoe rapidly and to a controllable temperature as, for example, in the range of 1000°–1400° F. It is noted that a full loop work coil 50 as illustrated may be employed to return the coil to ground at the generator and to provide terminals for water flow through the coil if such cooling is necessary. Alternately, the work coil may be grounded at the shoe. In either case, the shoes are preferably individually grounded to prevent sparking between shoes.

The heated shoes press against the seam to transfer heat to the seam simultaneously heating the solder to the melting point and providing the mechanical force necessary to ensure good sheath-solder-sheath contact. The mechanical contact is maintained during cooling of the solder in an impervious bond between the edges of the sheath.

Since the cable must be processed at a speed of the order of 80–100 ft./min. for economical fabrication thereof, heat transfer to the seam must be controlled to properly melt the solder while avoiding damage to the sheath by application of excessive temperatures thereto. For example, when six shoes are used, the first two shoes will merely heat the solder without reaching the temperature at which the solder becomes molten or even pasty. The shoes 18 and 20 may, therefore, be heated of the order of 1000° F. This allows the requisite heat transfer to the solder 16 through the upper edge 54 of the sheath. Attempts to heat the solder directly to the melting point by the first shoe or shoes at high cable processing speeds would burn the upper edge 54 of the sheath. The next plurality of shoes, such as shoes 22 and 24, will continue to heat the soldered seam until solder reaches a pasty condition. The final shoes 26 and 28 will heat the seam to the order of about 600°, melting the solder. The shoes maintain the pressure necessary to provide intimate contact between the lapped edges of the sheath with the molten solder therebetween. To quickly cool the seam in a solder bond, there is provided a cooling shoe 58. Shoe 58 is preferably water cooled to prevent destruction of the shoe by the continued heating of the soldered seam. In addition, water jets 64 are preferably provided to further cool the seam temperature to below the temperature at which the solder becomes solid. It is important throughout that the pressure be maintained during cooling to prevent creation of voids in the seam, destroying the integrity of the sheath. The pressure must be carefully maintained to prevent extruding the entire molten solder from between the seam. Additional cooling shoes may be provided if the conditions so require.

Thus, there is provided means for soldering a seam in a continuous sheath of non-ferrous material which overlaps the cable core. The utilization of RF energy allows relatively precise control of the temperature of each shoe to provide the maximum temperature gradient across the seam without exceeding the maximum temperature tolerable by the seam material. Moreover, the coupling between the work coil and the steel shoe is a very close coupling allowing efficient utilization of the RF energy.

While six shoes have been selected for illustration, it will be appreciated that the number of shoes will depend upon the cable speed and the cable diameter. In general, the number of shoes will range between six and nine shoes. However, the function of the shoes in raising the temperature in increments will bear approximately the same ratio of that set forth in the illustrated example irrespective of the actual number of shoes employed.

In FIGS. 4 and 5 there is shown another embodiment of this invention.

The cable 10 is encased within a corrugated, non-ferrous sheath 14 having a lapped seam with an inserted solder ribbon 16. The cable is fed through a plurality of shoes 62. The shoes 62 are formed of glass of a composition and mechanical strength suitable for the application. Since such shoes are known to the art, no details are necessary.

The shoe holders 32 and mountings are identical with the arrangement shown in FIG. 1. Thus, identical parts have received identical reference numerals and detail illustration of duplicate parts omitted for clarity.

A roll of corrugated steel strip 64 is carried on a storage roller 66 at the entrance to the plurality of shoes. The steel strip is corrugated in the same manner as the sheath so that the steel strip will mate with the sheath.

The steel strip is fed over the seam and travels with the cable under the shoes. The work coil 50 will generate an RF field which will heat the steel strip. The shoes 62 maintain close contact of the heated steel strip with the seam to heat the overlapped edges and the solder until the solder melts.

The pressure is maintained and the seam cooled by cooling shoe or shoes 58 to solidify the solder to form the seam. At this point the steel strip may be removed from the seam and coiled on a storage roll 68. Guide rollers 70 are preferably provided to position the steel strip and to guide the strip as it is applied to and removed from the cable. In this manner, there is provided, in effect, a traveling or transitory shoe which moves with the seam to heat the solder.

This invention may be variously embodied and modified within the scope of the subjoined claims.

What is claimed is:

1. Apparatus for continuously forming a soldered seam in an electric cable sheath as it is formed on a moving core of insulated conductors by folding a metal strip longitudinally with the longitudinal edges of the strip overlapping and separated by a solder ribbon comprising, in combination, means for pressing the outer overlapping strip edge toward the inner overlapped strip edge in firm contact with the interposed solder ribbon, said pressing means comprising a transitory shoe that contacts with the outer overlapping strip edge and that travels with the sheath in heat-transfer engagement therewith, and means for establishing a radio frequency electro-magnetic field along the course of movement of the transitory shoe, said shoe being made of material that is heated inductively by said field to supply heat by conduction to the outer strip edge to melt the solder ribbon pressed between the strip edges.

2. The apparatus described in claim 1 characterized by the transitory shoe being a second strip, a holder for a coiled portion of the second strip and from which the second strip is supplied to the seam to form the transitory shoe, and means downstream from the electro-magnetic field and about which the second strip winds to remove it from the sheath as the sheath and transitory shoe advance through the electro-magnetic field.

3. The apparatus described in claim 1 characterized by the sheath being corrugated with corrugations extending around the sheath, the transitory shoe also being corrugated and fitting into the corrugations of the sheath, and means for positioning said shoe over said seam prior to movement of the core and cable sheath under the edge-pressing means.

4. The apparatus described in claim 3 characterized by the transitory shoe being a corrugated steel strip, a holder for a reel portion of the corrugated steel strip, the holder being located in position to supply additional length of the steel strip progressively to the sheath to form added length for the transitory shoe.

5. The method for continuously forming a soldered seam in an electric cable sheath which is made of highly conductive metal unsuitable for direct heating by electric induction heating, and as part of a process in which the sheath is formed around a moving core of insulated conductors by folding the metal strip about the core with the longitudinal edges of the strip overlapping and separated from one another by a solder ribbon, and while the edges are held together and in contact with the solder strip by a shoe in contact with the outer of the overlapping strip edges, said method comprising the steps of applying heat to the seam by conduction from the shoe for locally heating the sheath to melt the solder, restricting the contact of the shoe to the region of the seam while the remainder of the sheath remains out of contact with the shoe, generating an electro-magnetic field of high frequency at the side of the sheath having the seam and only on that side, spacing the field with respect to the sheath and on the other side of the shoe from the sheath so as to concentrate the inductive heating in the shoe rather than the sheath, heating the shoe by said induction heating to a temperature to melt the solder strip by conduction heating and with minimum heating of the core within the sheath.

6. The method described in claim 5 characterized by moving the shoe with the sheath while advancing the sheath in the direction of its length whereby the shoe is a transitory shoe for increasing the time for heat conduction to the solder strip without decreasing the rate of advance of the sheath.

7. The method described in claim 6 characterized by forming the shoe from a strip of metal which is wound in a reel, unwinding metal from said reel ahead of the electro-magnetic field, passing the unwinding strip into contact with the sheath, in which position the metal unwound from the reel forms the shoe that is heated by electro-magnetic induction and that heats the seam edge and solder strip by conduction.

8. The method described in claim 7 characterized by winding the metal of the shoe on a takeup reel beyond the end of the electro-magnetic field.

9. The method described in claim 8 characterized by the method being used on a corrugated sheath of which the corrugations extend around the sheath, supplying transversely corrugated strip to form the shoe with the corrugations of the size to fit into the corrugations of the sheath, and holding the transitory shoe in contact with the sheath at axially spaced locations along the length of the sheath.

References Cited by the Examiner

UNITED STATES PATENTS

| 2,088,446 | 7/37 | Specht | 29—474.1 |
| 2,627,010 | 1/53 | Matteson et al. | 29—501 X |
| 2,801,316 | 7/57 | Hughes | 219—8.5 X |

OTHER REFERENCES

Seybolt & Burke: Procedures in Experimental Metallurgy, 1953, J. Wiley & Sons, Inc., pages 12–16 and 162–164.

JOHN F. CAMPBELL, *Primary Examiner.*